United States Patent [19]

Chojnowski

[11] Patent Number: 5,053,584
[45] Date of Patent: Oct. 1, 1991

[54] ADJUSTABLE SUPPORT ASSEMBLY FOR ELECTRICAL CONDUCTORS

[75] Inventor: Dean W. Chojnowski, Massillion, Ohio

[73] Assignee: Controlled Power Limited Partnership, Canton, Ohio

[21] Appl. No.: 557,229

[22] Filed: Jul. 25, 1990

[51] Int. Cl.$^5$ .................. H02G 5/06; H01B 17/18
[52] U.S. Cl. ................... 174/99 B; D25/119; 174/171
[58] Field of Search ................ 174/68.2, 70 B, 99 B, 174/99 E, 100, 149 B, 171; 361/378, 429; D25/119, 120, 121, 123, 125

[56] References Cited

U.S. PATENT DOCUMENTS

| D. 301,623 | 6/1989 | Grosjean | D25/119 |
| 2,059,986 | 11/1936 | Frank et al. | 174/99 E X |
| 2,733,289 | 1/1956 | Warren et al. | 174/99 B |
| 3,011,011 | 11/1961 | Christensen | 174/99 B |
| 3,041,506 | 6/1962 | Schlessel et al. | 174/99 B X |

FOREIGN PATENT DOCUMENTS

| 33486 | 4/1964 | Finland | 174/99 B |
| 589657 | 1/1978 | U.S.S.R. | 174/149 B |

Primary Examiner—Laramie E. Askin
Attorney, Agent, or Firm—Fitch, Even, Tabin & Flannery

[57] ABSTRACT

An adjustable dielectric bus support clamp with a liner has a duct sidewall for adjustably supporting dielectric clamps which support high current capacity electrical conductors. A resilient dielectric liner fits between the dielectric clamp and the electrical conductor to fill high potential voids and provide corona damping, while at the same time allowing different sized liners to be used with different sized conductors.

7 Claims, 3 Drawing Sheets

ADJUSTABLE SUPPORT ASSEMBLY FOR ELECTRICAL CONDUCTORS

BACKGROUND OF THE INVENTION

1. Field of the Invention

The present invention pertains to systems which support and insulate elongated electrical conductors and more particularly, to an apparatus for insulating high current electrical bus conductors by clamping the bus conductors with insulating clamping members suspended within a bus duct.

2. Description of the Related Art

Electrical power distribution networks and switchgear systems require that high voltage electrical bus conductors be electrically isolated from other conductors and environmentally protected from indoor contaminants and from outdoor elements in order to safely deliver power to various points in an electrical system. Of interest here are support structures which insulate electrical bus conductors within ducted chambers, by insulatively supporting the electrical conductors. Examples of some applications with these requirements include mass transit systems, power distribution networks, power generation systems and various industrial applications.

Electrical bus conductors may have either a circular or an elongated cross-section. Attention here will be drawn to the latter configuration, commonly termed "bus bars." Bus bars are available in a variety of sizes, so it would be desirable to accommodate a variety of such conductors with a limited number and type of insulation and support parts. A "one size fits all" solution is desirable because significant savings in production and inventory costs may be realized. Also, labor costs are reduced, because systems are more easily and quickly assembled. Moreover, damaged parts of an assembly may be readily replaced by standard stock components.

There are two types of insulating support structures currently in use today. They include through-type insulators and standoff insulators.

A through-type insulator slides onto a bus bar. The insulator is then supported within the bus duct by being attached to an internal framework using bolts or other fasteners. Basically, these insulators are one-piece parts with a slot or hole in the center for receiving the bus bar. The slot is dimensioned to fit a specific bus bar size.

Alternatively, bus bars may be supported on standoff insulators, typically made of porcelain or other ceramic. Although the standoffs insulators may be used with many bus bar sizes, this is accomplished by drilling holes into the bus bars to bolt them to the standoff insulators. Since drilling holes through a bus bar compromises its insulating jacket and creates the potential for corona arcing, the bus bar must be re-insulated before being used. The holes also increase the electrical resistance of the bus bar. Moreover, the operation of drilling holes and attaching standoff insulators is labor intensive.

It would also be desirable for bus bar support members to be adjustable, allowing the intervals between bus supports to be shortened or lengthened as needs change. An adjustable bus support structure provides a flexibility which may ultimately lead to cost reduction through labor savings, by eliminating a need for design work, and by providing an ability to upgrade the application without major modifications. The through-type bus support insulator can be relocated, but only with a great deal of difficulty, requiring new holes to be drilled in the support duct in which they are enclosed, thus compromising the integrity of the bus duct.

When bus bars are supported by an insulating member, whether it be a device which slides onto the conductor or one which functions as a standoff for the conductor, a dielectric material is needed between the bus bars and the insulators to fill the voids in the high potential field created therebetween. Currently, RTV silicone (room temperature vulcanizing silicone) is applied between the insulator and the bus bar to fill such voids. This is a messy and time consuming task which often leads to quality problems and added expense. Moreover, with through-type insulators, the bus bar must be centered in the slot while the RTV silicone is applied. This process can require up to 15 minutes assembly time and several days curing time for each insulator. It would be desirable to alleviate the problems associated with applying RTV silicone to save on labor expense and ultimately total system installation expense, while at the same time providing a higher quality, more efficient and less expensive bus support system.

It is also desirable to provide a ducted support chamber which is waterproofed, by eliminating outer openings in the bus duct walls. Currently, bus conductor support means are connected to bus ducts by drilling holes in the duct and bolting the support structures to the duct. This breaches the outer wall of the bus duct, thus diminishing the ability of the duct to exclude outside elements. Since power distribution networks are often located outdoors or in a contaminated environment, the integrity of the duct wall is crucial. Condensation and airborne contaminants within a bus duct carrying high currents increases the likelihood that bus bars will arc between each other or arc to the bus duct itself.

Currently, heaters are often installed within ducts to remove condensation. While heaters can solve some problems with condensation., it is a rather expensive approach; thus, it would be desirable to reduce or eliminate the amount of heating required in a bus duct by improving the integrity of the bus duct.

The elimination of openings improves integrity of a duct, but this is often done at the expense of flexibility, thus making it more difficult to adjust or upgrade a power distribution system. Though such trade-offs are often necessary, it would be desirable to have a system which preserves the integrity of the bus duct and provides the flexibility of a "one size fits all" solution.

SUMMARY OF THE INVENTION

It is an object according to the present invention to provide a dielectric clamping member for suspending an elongated electrical conductor from a clamp retaining wall within a ducted chamber.

Another object according to the present invention is to provide a dielectric clamping member which accommodates a wide variety of different size electrical conductors and adjustably supports conductors at variable intervals so as to eliminate design work and labor requirements associated with modifying the bus duct by providing a flexible means of supporting electrical conductors.

A further object according to the present invention is to provide a duct sidewall apparatus for adjustably supporting dielectric clamps within a ducted chamber, so as to allow upgrade without undue modification to the ducted chamber. Such a unitary support wall also eliminates openings and will make the bus duct waterproof, thereby preserving the integrity of the duct walls.

Another object of the present invention is to provide a resilient dielectric liner member for insulatively spacing electrical conductors from dielectric insulators, thereby filling the void in the high potential field therebetween without the use of RTV silicone. This alternative to RTV silicone ultimately reduces the time requires to assemble insulating support structures, while inexpensively providing void-free corona damping and alleviating associated quality problems.

A further object of the present invention is to provide a shock absorbing conductor support.

DETAILED DESCRIPTION OF THE PREFERRED EMBODIMENTS

Figure 1:
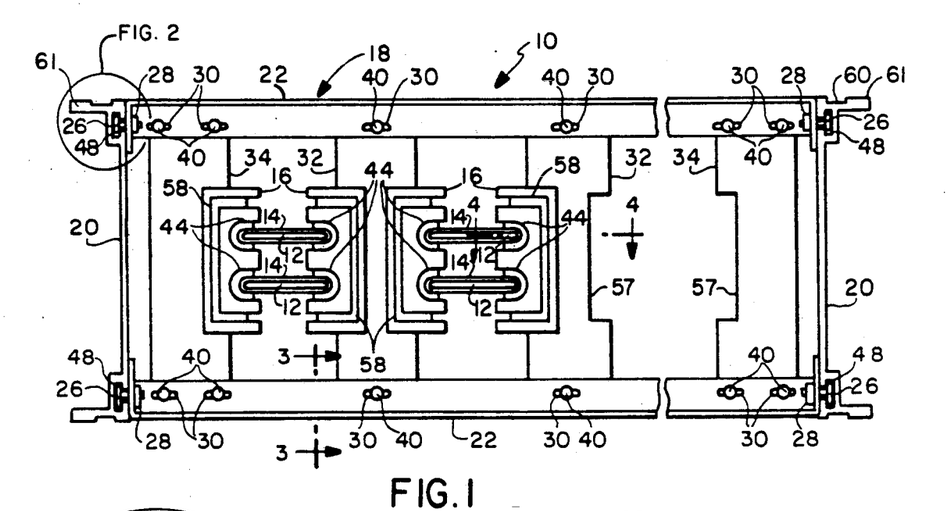
FIG. 1 is a front elevational view of a conductor support system illustrating principles according to the present invention.

Referring now to the drawings and initially to FIG. 1, a conductor support assembly is generally indicated at 10. The conductor support assembly 10 insulatively supports the bus bar conductors 12 of a multiple phase power distribution system. Each conductor 12 has an insulating jacket 14. One or more conductors 12 of a single electrical phase are clamped between a pair of dielectric conductor clamping assemblies 16. The conductors 12 associated with different electrical phases are clamped between respective pairs of dielectric conductor clamping assemblies 16.

For example, the conductor support assembly 10 illustrated in FIG. 1 insulatively supports multiple being shown), with each electrical phase located between a pair of clamping assemblies 16 being shown with two bus bar conductors 12. The conductor sup ort assembly 10 provides space for three electrical phases with the clamping assemblies 16 accommodating either one or two conductors per electrical phase, depending on the electrical requirements of the three phase system.

Figure 5:
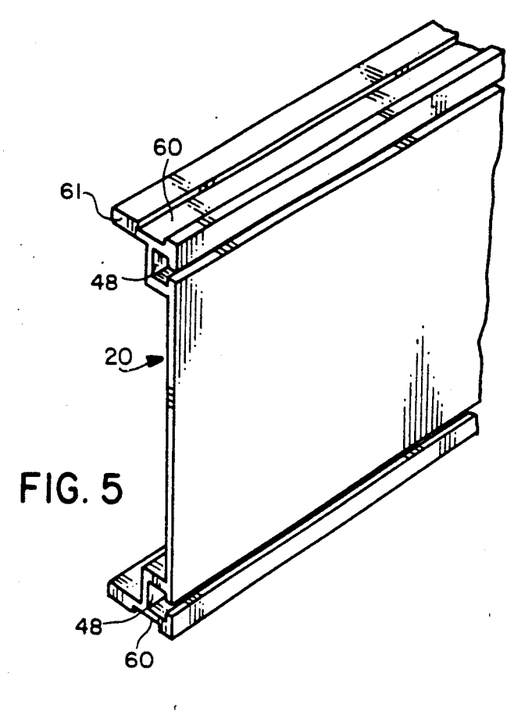
FIG. 5 is a fragmentary perspective view of the sidewall member thereof.

The conductor support assembly 10 includes a metallic outer frame 18 having opposed sidewalls 20 and a plurality of opposed support brackets 22 extending between the sidewalls 20. Top and bottom walls, not shown, extend between the sidewalls 20, forming a bus duct enclosure. The sidewalls 20 have a rigid unitary construction and are preferably manufactured by extruding metal such as aluminum into elongated pieces as illustrated in FIG. 5. The length of the sidewall 20 may be unlimited, and the preferred embodiment utilizes sidewalls 20 with lengths as long as twenty feet.

Figure 2:
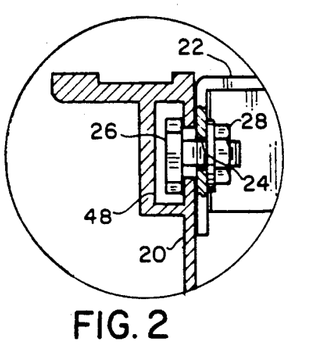
FIG. 2 is an enlarged, fragmentary view of the circled portion labeled FIG. 2 in FIG. 1.
Figure 3:
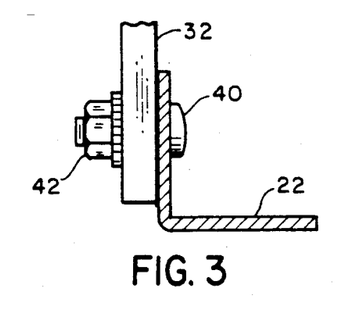
FIG. 3 is a fragmentary, cross-sectional elevational view taken along the line 3—3 of FIG. 1.

The support bracket 22 is made by folding a strip of metal so as to form an L-shaped angle as illustrated in FIG. 3. The support bracket 22 has opposed ends with end holes 24 therein for receiving a bolt 26 secured by a nut 28, as illustrated in FIG.2. As illustrated in FIG. 1, the support bracket 22 also has oval holes 30 therein.

Figure 13:
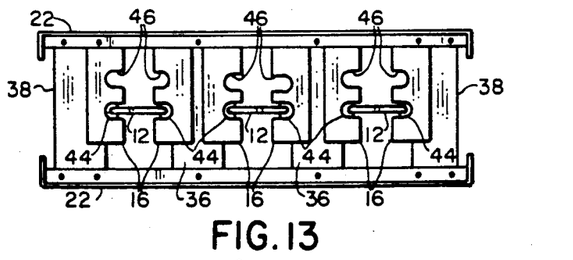
FIG. 13 is a front, elevational view of an alternative conductor support system according to the present invention.

A plurality of dielectric, generally I-shaped retaining panels 32 and generally C-shaped retaining panels 34 are attached to the support brackets 22 at the oval holes 30, as illustrated in FIG. 1. Referring to FIG. 13 the conductor support assembly may be configured for low profile installations, with generally T-shaped retaining panels 36 and generally L-shaped retaining panels 38 of reduced height such that the same clamping assemblies 16 may be used to support only one conductor 12 per phase, which is centered within metallic outer frame 18. The retaining panels 32, 34, 36 and 38 are made from an epoxy and fiberglass material. The oval holes 30 provide adjustable spacing of the retaining panels 32, 34, 36 and 38. FIG. 3 shows a cross-sectional view of the support bracket 22 and the retaining panel 32, 34, 36 or 38 to illustrate the way in which the retaining panels 32, 34, 36 or 38 are fastened to the support bracket 22 with a bolt 40 and a nut 42 at oval hole 30.

Conductor clamping assemblies 16 are interlocked with respective retaining panels. Mid-portions of the clamping assemblies are received in notched areas defined by opposing retaining panels 32, 34, 36 or 38.

Figure 11:
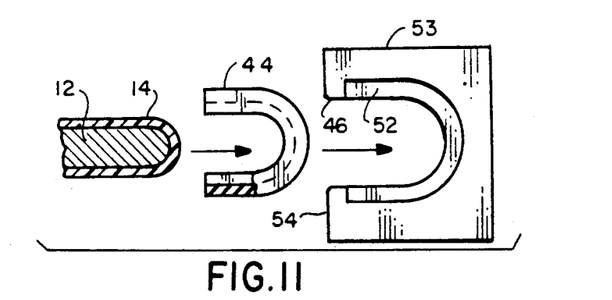
FIG. 11 is an exploded, elevational view of an alternative conductor-clamping assembly.
Figure 14:
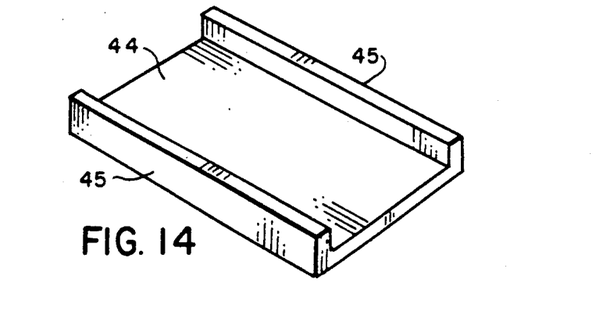
FIG. 14 is a perspective view of a resilient dielectric liner.

Conductor clamping assemblies 16 include a dielectric body 39 which is typically made from a porcelain or other ceramic material. A resilient dielectric liner member 44 is receivable in a conductor-receiving recess 46 defined by the conductor clamping assembly 16. As illustrated in FIG. 14, the resilient dielectric liner member 44 has a part rectangular cross-section with opposed side flanges 45. The liner 44 is preferably made from extruded silicone to provide high dielectric strength, dielectric matching with the insulating jacket 14, and shock absorbing qualities important when shipping a completed bus duct assembly, and under high current fault conditions. The liners 44 provide cushioning of the ceramic bodies 39, reducing the risk of damage to the conductor support and insulation structure of assembly 10. FIG. 11 illustrates the liner 44 which is bent to form a U-shape with the side flanges 45 protruding outwardly. The conductor-receiving recess 46 receives the liner 44 to provide a close tolerance void-free engagement with the conductor 12. Preferably, the liner 44 provides a wedging engagement between the conductor 12 received in the conductor-receiving recess 46 of the clamping body 39. As shown, only the opposed lateral edges of the conductor 12 are received by the conductor-receiving recesses 46. The recesses of the supporting body are over-sized, with the liners 44 making up the size difference. Thicker liners are used with smaller conductors, and the bodies 39 of a clamping pair are moved closer together, thus providing a range of size adjustments. The conductor clamping assemblies 16 are supported by an interlocking engagement with the retaining panels 32, 34, 36, or 38.

As mentioned, a protective ducted chamber is formed when top and bottom opposed walls (not illustrated) extend between sidewalls 20 to form a waterproof enclosure. FIG. 5 illustrates that the sidewalls 20 have a solid, waterproof construction. A channel 60 is defined at the end portions 61 of the sidewalls 20. The channel 60 receives a gasket (not illustrated) to ensure a watertight seal with upper and lower duct walls. The ducted chamber environmentally protects the conductors from indoor contaminants as well as outdoor elements.

Figure 6:
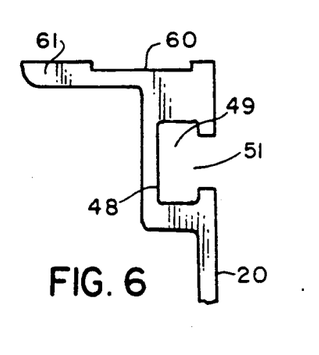
FIG. 6 is a fragmentary, end elevational view of the top end of the sidewall of FIG. 5.
Figure 12:
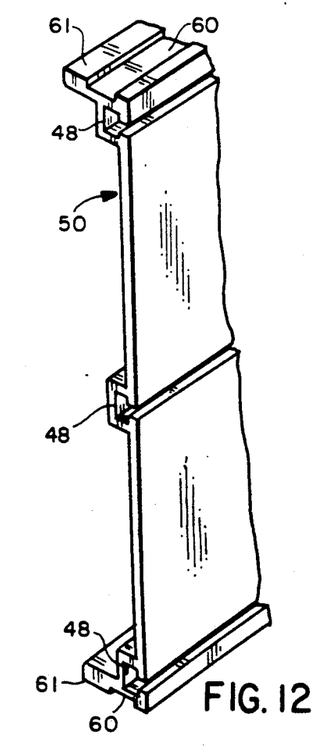
FIG. 12 is a fragmentary perspective view of an alternative embodiment of a sidewall according to the present invention.

FIG. 1 and FIG. 2 illustrate the sidewall 20 having a partially closed bolt-receiving channel 48 defining a slot therein with a generally T-shaped cross-section. The partially closed channel receives and retains a captive bolt 26. The captive bolt 26 and nut 28 are then used to attach the support bracket 22 to the sidewall 20. The channel 48 is illustrated in greater detail in FIG. 6 and may be seen to have a head portion 49 extending along the sidewall and a stem portion 51 opening to the inner sidewall surface. FIG. 5 illustrates the sidewall 20 having two channels 48, and FIG. 12 illustrates an alternative sidewall 50 with a third channel 48.

The sidewalls 20 and the channel 48 provide flexibility by enabling the support brackets 22 to freely traverse longitudinally within the ducted chamber, thus allowing the support brackets 22 to be spaced at varying intervals, as dictated by the requirements of a particular application. The channel 48 provides flexibility without compromising the integrity of the sidewall bus duct and without requiring costly welding operations on the duct wall members. The retaining panels 32, 34, 36 and 38 are adjustably supported by the support brackets 22, enabling the conductor support assembly 10 to accommodate conductors 12 of a variety of widths by changing the spacing between the retaining panels 32, 34, 36 or 38, thus varying the spacing between the clamping assemblies 16. As mentioned, the liner 44 enables a single clamping body 39 to accommodate a variety of conductor thicknesses by changing the thickness of the liner 44. Thicker liners 44 accommodate thinner conductors 12, and thinner liners 44 accommodate thicker conductors 12.

In other aspects, the clamping assembly 16 can be formed to accommodate either a plurality of conductors 12, as shown in FIG. 1, or a single conductor 12, as shown in FIG. 13. Moreover, whereas FIG. 1 shows the conductor support assembly 10 for a three-phase system with two conductors 12 per phase, FIG. 13 illustrates the conductor support assemblies 10 with a single conductor 12 per phase. This configuration makes an upgrade of the conductor support assembly 10 to a two-conductor per phase assembly relatively simple by replacing panels 36, 38 with panels 32, 34. The present invention can also be used with other types of electrical systems where multiple bus conductors are disposed in a common duct. Examples include single phase and direct current systems.

The conductor support assembly according to the present invention provides a "one-size fits all" solution to the problem of insulatively supporting electrical conductors 12. As illustrated, the clamping assembly pairs 16 are supported by the retaining panels 32, 34, 36 or 38. It has been seen that one or more conductors 12 per phase may be accommodated by the conductor support assembly 10, as electrical requirements dictate. Moreover, the size of the conductors 12 can vary, and conductor support assembly 10 will accommodate the various sizes by changing the distance between clamping assembly pairs 16 or by changing the size of the liner 44. The aforementioned flexibility eliminates custom design work and simplifies installation. Moreover, the forming, punching and welding originally required to attach bus supports is also eliminated.

The clamping assembly 16 and the liner 44 provide additional savings over the through-type and standoff insulators, because the liner 44 provides void-free corona damping with a wedging engagement between the conductor 12 received in the conductor-receiving recess 46 and the conductor clamping assembly 16, thus filling the voids in the high potential field surrounding the conductors. Moreover, the voids are filled without the use of RTV silicone. Thus, the messy and time-consuming task of applying RTV silicone, required by systems using through-type and standoff insulators, is no longer necessary.

Figure 7:
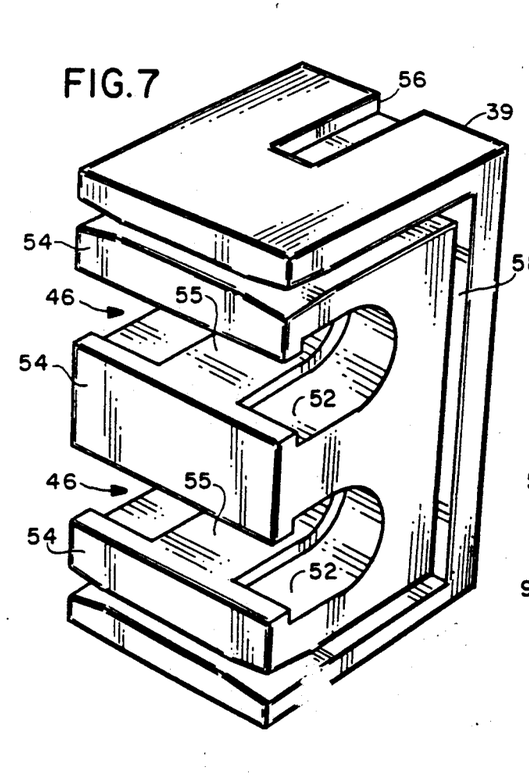
FIG. 7 is a perspective view of a conductor-clamping insulator.
Figure 8:
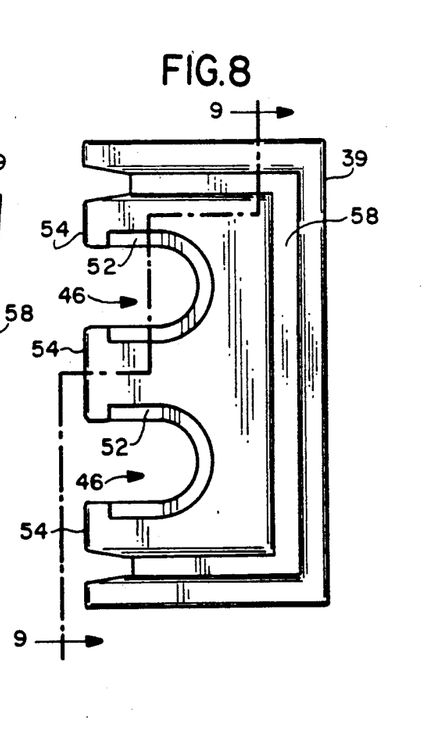
FIG. 8 is a side elevational view of the insulator of FIG. 7.
Figure 9:
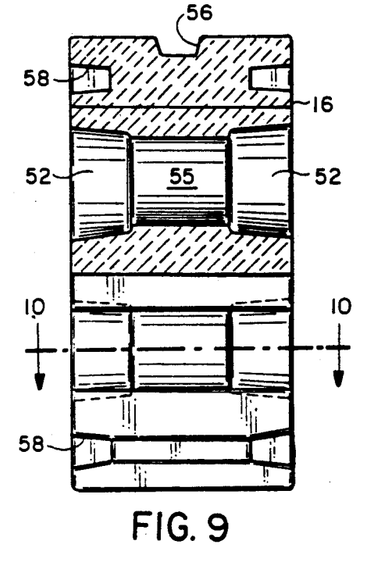
FIG. 9 is an elevational view of the insulator of FIG. 8 shown partly in cross-section, taken along the line 9—9 thereof.
Figure 10:
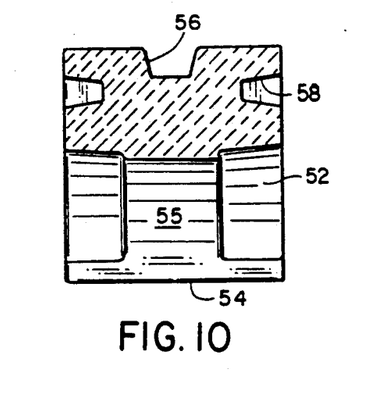
FIG. 10 is a cross-sectional view of the insulator, taken along the line 10—10 of FIG. 9.

FIG. 11 illustrates an alternative, single recess clamping body 53. The lateral edge of the conductor 12 is received in the conductor-receiving recess 46 such that the liner 44 fills the void therebetween, as described above for the double recess embodiment. In either embodiment, arcuate depressions 52 are defined by the clamping body and wall portions 54 are provided from the front surface of the clamping body 16 to close the ends of depressions 52, to provide a positive retention for the liner 44, with the liner r flanges 45 received in the depressions 52. As seen in FIG. 7 for example, a raised shoulder 55 is formed between the depression 52. The raised shoulder engages the intermediate portion of liner 44, and the ends of the liner are pressed between the wall portions 54, thus securing liners 44 in position for convenient fabrication of a clamping assembly 16.

Figure 4:
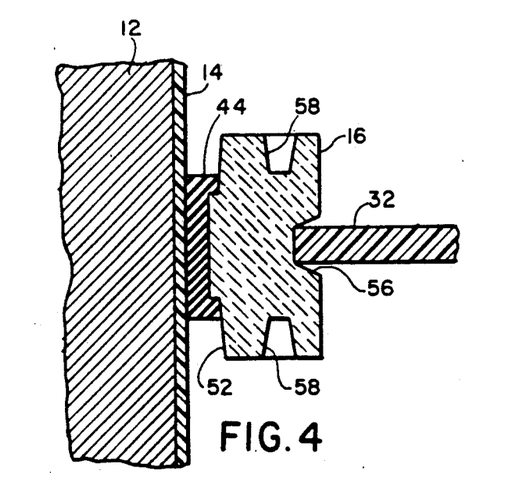
FIG. 4 is a fragmentary, plan view thereof taken along the line 4—4 of FIG. 1.

The dielectric clamping assembly 16 is supported by an interlocking engagement with the retaining panels 32, 34, 36 or 38, at the notch 57 defined therein (see FIG. 1). A mounting channel 56 is formed in the back and end surfaces of the clamping body 39 as illustrated in FIGS. 4, and 7. The mounting channel 56 extends along the centerline back surface of the clamping body 39 and into part of its top and bottom end portions. Edges of the retaining panels forming the notches 57 are received in the mounting channels 56 with a relatively close tolerance fit, to provide an interlocking engagement. A recess 58 surrounds the conductors 12 for the purpose of increasing the electrical creep distance along the surface of the clamping assembly 16 from the conductors 12 to the support structure of the bus duct. This improves the insulating characteristics of the clamping assembly 16.

In the examples described above, the bus conductors are elongated in a horizontal direction. With little or no modification, the present invention can also accommodate vertically elongated bus conductors. For example, referring to FIG. 1, a bus bar assembly is received in each pair of opposed recesses 57, comprising a pair of clamping assemblies 16 and a pair of bus conductors 14. If desired, the bus bar assembly can be rotated 90°, with the ends of a mounting channel 56 engaging respective retaining panels. Referring to FIG. 1, a third bus bar assembly could be installed in the third, open position, with a dielectric body 39 disposed above both bus conductors. One end of the mounting channel 56 of the body 39 engages the retaining panel 32, and the other end engages the retaining panel 34. A second dielectric body 39 is disposed below the bus conductors in a mirror image arrangement.

Those skilled in the art will readily appreciate that the support assembly provides an adjustable, easily repositionable insulating assembly without compromising the integrity of the duct structure. Although the present invention has found immediate acceptance in the field of high power electrical transmission and distribution systems, many other types of electrical equipment can also benefit from the present invention. For example, many types of electrical test equipment are operated at high voltages and often require that electrical conductors be insulated, as do mass transit systems and various industrial applications. Those skilled in the art will readily appreciate that the clamping bodies can be adapted to receive cylindrical conductors of varying sizes with a shortening of the depth of recesses 46. Also, the clamping bodies can accommodate bus conductors of square or rectangular cross-section, as well as conductors which are extruded or otherwise formed to have an irregular multi-sided cross-section. In each of these alternative embodiments, the liners are configured as required to fill the voids between the conductors and the clamping body recesses.

From the foregoing, it is evident that the invention provides a novel and improved insulating support structure for electrical conductors. A description of the present forms of the invention having been described by way of example, it is anticipated that variations of the apparatus may be made without departing from the invention and the scope of the appended claims. The invention is not limited to any particular embodiments described above or to any particular embodiments, but is defined by the following claims.

What is claimed is:

1. A conductor clamping apparatus for supporting an elongated electrical conductor having opposed lateral edges between a pair of opposed spaced apart retaining panels which have an edge portion defining a notch located adjacent each edge and extending generally perpendicular to the longitudinal axis of the conductor, the apparatus comprising a dielectric body for insulatively spacing the elongated electrical conductor from one retaining panel and for rigidly supporting the conductor from the retaining panel, the dielectric body having a front surface for facing toward the conductor, an opposed rear surface for facing away from the conductor, and a pair of spaced apart end portions extending between the front and rear surfaces, the dielectric body defining a conductor receiving recess located between the end portions extending from the front surface and the dielectric body further defining a mounting channel extending along the rear surface and at least a part of the end portions for receiving the edge portion of one retaining panel, with a portion of the dielectric body then received in the notch to thereby form an interlocking engagement between the dielectric body and the one retaining panel, said conductor clamping apparatus further comprising a resilient dielectric liner member receivable in said recess to provide a void-free engagement between a conductor when received in said recess and a portion of said dielectric body defining said conductor receiving recess, said dielectric body further including opposed side surfaces extending between said end portions and said front and rear surfaces, with said recess extending between said side surfaces, and the apparatus further including retention means for retaining said resilient dielectric liner member in said recess, comprising a pair of arcuate depressions defined by said dielectric body, one in each side surface, and each surrounding an end of said recess and cooperating with said recess so as to form a raised shoulder between the side surfaces, and said dielectric liner member has a generally U-shaped cross-section with opposed flanges received in the arcuate depressions and an intermediate portion in engagement with the raised shoulder.

2. The apparatus of claim 1, wherein said retention means further comprises wall portions extending from the front face of said dielectric body and positioned at the ends of each respective arcuate depression to thereby captivate the flanges of the dielectric liner member in the arcuate depressions.

3. A support assembly for mounting an elongated electrical conductor having opposing lateral edges within a ducted chamber, comprising:

a pair of duct sidewall members, each for adjustably supporting a retaining panel within a ducted chamber, each comprising an elongated body of generally U-shaped cross-section including an intermediate support wall enclosing the chamber interior, intermediate a pair of end walls extending away from the camber interior, the body defining a pair of slotted channels longitudinally extending along the body adjacent the end walls thereof, the channels defining a slot which is generally T-shaped in cross-section so as to have a head portion generally parallel to the intermediate support wall surface and a stem portion opening toward the intermediate support wall;

a pair of opposed, spaced-apart retaining panels, each adjustably supported by a respective duct sidewall member so as to be movable therealong for repositioning, each said panel having a lateral edge portion defining a notch therein;

a conductor clamping apparatus for supporting an elongated electrical conductor between the lateral edge portions of the pair of opposed, spaced apart retaining panels, said panels arranged such that the lateral edge portions thereof extend generally perpendicular to the longitudinal axis of the sidewall members;

a pair of dielectric body members for insulatively spacing the elongated electrical conductor from respective retaining panels and for rigidly supporting the conductor from the retaining panels, each dielectrical body member having a front surface for facing toward the conductor, an opposed rear surface for facing away from the conductor, and a pair of spaced part end portions extending between the front and rear surfaces, each dielectric body member defining a conductor receiving recess extending from the front surface and located between the end portions of that body member, and each dielectric body member further defining a mounting channel extending along the rear surface and at least a part of the nd portions of that body member for receiving the lateral edge portion of a respective retaining panel, with a portion of the dielectric body member received in the notch of that respective retaining panel to wedge the conductor between the air of retaining panels while interlocking each dielectric body member with a respective retaining panel; and a resilient dielectric liner member received in the recess of each dielectric body member to provide a void-free engagement between the conductor and the dielectric body member.

4. The assembly of claim 3, wherein each dielectric body member includes opposed side surfaces extending between the end portions, the conductor-receiving recess extending between said side surfaces, each dielectric body member further comprising retention means for retaining said resilient dielectric liner member in said recess comprising a pair of arcuate depressions defined by said dielectric body member, one in each side surface thereof, and each surrounding an end of said recess and cooperating with said recess so as to form a raised shoulder between the recess ends and the side surfaces, and wherein each dielectric liner member has a generally U-shaped cross-section with opposed flanges received in the arcuate depressions and an intermediate portion in engagement with the raised shoulder.

5. The assembly of claim 4, wherein said retention means further comprise enlarged head portions of said dielectric body member extending from the front face thereof and positioned at the ends of each respective arcuate depression to thereby captivate the flanges of the dielectric liner member in the arcuate depressions.

6. The assembly of claim 3, wherein each mounting channel is located along a centerline on the rear surface of a respective dielectric body member.

7. The assembly of claim 3 wherein a third slotted channel is defined by said elongated body, extending along said elongated body intermediate said pair of slotted channels, said third channel defining a slot which is generally T-shaped in cross-section so as to have a head portion generally parallel to the intermediate support wall surface and a stem portion opening toward the intermediate support wall.

* * * * *

UNITED STATES PATENT AND TRADEMARK OFFICE
CERTIFICATE OF CORRECTION

PATENT NO. : 5,053,584

DATED : October 1, 1991

INVENTOR(S) : Dean W. Chojnowski

It is certified that error appears in the above-identified patent and that said Letters Patent is hereby corrected as shown below:

In Column 1, line 8, after the word "and" insert a comma --,--.

In Column 1, line 50, change the word "standoffs" to read --standoff--.

In Column 2, line 33, after the word "crucial" insert a period --.--.

In Column 2, line 39, delete the comma "," after the word "condensation".

In Column 3, lines 9-10, change the word "requires" to read the word --required--.

In Column 3, line 65, after the word "multiple" insert the phrase --electrical phases (space for three clamping assemblies--.

In Column 6, line 34, delete the "r" after the word "liner".

UNITED STATES PATENT AND TRADEMARK OFFICE
CERTIFICATE OF CORRECTION

PATENT NO. : 5,053,584
DATED : October 1, 1991
INVENTOR(S) : Dean W. Chojnowski

It is certified that error appears in the above-identified patent and that said Letters Patent is hereby corrected as shown below:

IN THE CLAIMS:

In Column 8, line 29 (Claim 3, line 10), change "camber" to read --chamber--.

In Column 8, line 53 (Claim 3, line 34), change "dielectrical" to read --dielectric--.

In Column 8, line 56 (Claim 3, line 31), change "spaced part" to read --spaced apart--.

In Column 8, line 63 (Claim 3, line 44), change "nd" to read the word --end--.

In Column 10, line 4 (Claim 5, line 2), change "comprise" to read --comprises--.

Signed and Sealed this

Twenty-eighth Day of December, 1993

Attest:

BRUCE LEHMAN

Attesting Officer

Commissioner of Patents and Trademarks